United States Patent [19]

Ciuti et al.

[11] 4,026,817

[45] May 31, 1977

[54] METHOD FOR THE PREPARATION IN A CONTINUOUS WAY OF WATER/OIL EMULSIONS AND APPARATUS SUITABLE THEREFOR

[75] Inventors: Brunello Ciuti, San Donato Milanese; Ferdinando Angelini, Milan; Ernesto Brandolese, Grafignana, all of Italy

[73] Assignee: Snam Progetti S.p.A., Milan, Italy

[22] Filed: July 3, 1975

[21] Appl. No.: 592,730

[30] Foreign Application Priority Data

July 4, 1974 Italy ................................ 24788/74

[52] U.S. Cl. .............................. 252/312; 252/49.5; 252/309; 252/314; 252/359 D; 252/359 R; 259/DIG. 30

[51] Int. Cl.[2] ..................... B01J 13/00; B01F 3/08; B01F 5/04

[58] Field of Search ............... 252/309, 314, 359 R, 252/359 D, 312; 259/DIG. 30

[56] References Cited

UNITED STATES PATENTS

| | | | |
|---|---|---|---|
| 1,111,689 | 9/1914 | Dolan | 259/DIG. 30 |
| 1,152,456 | 9/1915 | Vogelsang | 252/314 X |
| 1,330,174 | 2/1920 | DeCew | 252/314 X |
| 2,233,965 | 3/1941 | Strovink | 252/314 X |
| 2,652,234 | 9/1953 | Feldman | 259/DIG. 30 |
| 2,684,949 | 7/1954 | McMillan et al. | 252/314 |
| 2,965,362 | 12/1960 | Flottmann et al. | 259/DIG. 30 |
| 3,334,051 | 8/1967 | Kinyon et al. | 252/314 |

*Primary Examiner*—Richard D. Lovering
*Attorney, Agent, or Firm*—Ralph M. Watson

[57] ABSTRACT

An oil in water emulsion is prepared as a continuous process by causing a stream of water to flow through a duct containing a Venturi providing a converging frustum of a cone zone, a diverging frustum of a cone zone and a central zone joining the two frustum of a cone zones, so that the stream flows through a zone upstream of the Venturi where it is directed along a helicoidal path through the converging frustum of a cone zone to the central zone, drawing oil for emulsification to the duct at the zone upstream of the Venturi and causing it to flow along a helicoidal path in the same direction as the water to the central zone so that the oil and water mix and emulsify in that central zone, causing the emulsion so formed to flow through the diverging frustum of a cone zone, then causing the emulsion to flow along a helicoidal path of reverse slope, and thereafter discharging the emulsion from the duct.

4 Claims, 4 Drawing Figures

METHOD FOR THE PREPARATION IN A CONTINUOUS WAY OF WATER/OIL EMULSIONS AND APPARATUS SUITABLE THEREFOR

The present invention relates to the preparation as a continuous process of water/oil emulsions and to apparatus suitable therefor.

It is known that, for ecological reasons, the oil in water emulsions used in the various operations of cutting, moulding and wire drawing of metals must be discharged as infrequently as possible.

This fact is of great importance also from an economical point of view since each mass to be discharged must be pretreated in order to separate the oily parts.

A durable conservation of the emulsions depends on a whole series of factors related to the conditions under which the emulsions work and, obviously, to the type of operations.

There are some precautions which, if suitably and timely taken, may contribute to prolonging the emulsion duration (circuit cleaning, effective filtration, disinfection, aeration and so on) but important above all is the way in which the emulsion is prepared.

It is known that the emulsions mentioned above are constituted by very small oil particles dispersed in a certain mass of water.

The preparation is usually carried out by maintaining the water mass under such a stirring that there is energy sufficient to subdivide the poured oil into fine drops to forming oil/water emulsions.

In an operation of that kind, if the oil flow rate is too high for a certain type of stirring there is the tendency to form more or less high amounts of inverted water in oil emulsions.

This latter type of emulsion has drawbacks which contribute to shortening the working life of the emulsion mass.

This, above all, depends on the fact that such water in oil emulsions tend to form a "seal" on the free surface which seal lowers the possibility of aeration favouring the enrichment and development of bacterial colonies. In practice, usually, the mode of preparation of the emulsion is not taken into due account and one acts as he can, generally employing discontinuous mixers which prove to be, among other things, not usable when the plant to be fed is very large as is the case with some centralized plants. In such cases oil is poured directly into a moving mass of water in either preparing a new emulsion or in increasing the concentration of one which has been already utilized.

In such a situation it is obvious that the best emulsion structure would depend upon the intrinsic properties of the particular emulsifiable oil, and with an excess of solvents or emulsifying agents.

This however gives other negative characteristics to the emulsion and, generally, a high tendency to form foams so that it is necessary to not alter the composition excessively and, on the contrary, the emulsions must be prepared with the most suitable mechanical means.

Since people using emulsions are generally not equipped and are not convinced of the aforesaid necessity, in practice emulsions are still prepared in a defective and occasionally absolutely inadequate way.

It has been found, and this is the subject of the present invention, that it is possible to overcome the drawbacks of the known art (insufficiently stable emulsions or excessive quantity of additives) simply by mixing oil with water in a duct which, among other things, is provided with a Venturi, exploiting the flow rate and pressure of water flowing therethrough for drawing upstream of the Venturi oil introduced through a tube, preferably perpendicular to the duct which is provided with a Venturi.

The method which is the subject of the present invention consists in introducing water into a duct, in subjecting the water inside the duct to a helicoidal motion and in drawing to the zone in which helicoidal motion is given to the water, the oil necessary for the emulsion, in feeding the water to a zone of the duct having a gradually decreasing diameter (the converging frustum of a cone zone) and then gradually increasing diameter (the diverging frustum of a cone zone) (Venturi), said water being introduced into the converging frustum of a cone zone after having flowed along involuted grooves, the oil mixing with the water in the central zone joining of the two frustum of a cone zones, after having been subjected to a helicoidal motion having the same direction as that of water, in subjecting water and oil coming from the diverging frustum of a cone zone to a centrifugal helicoidal motion having a slope in the direction opposite to the foregoing ones (preferably through a perforated baffle having holes with convergent axes); and then if desired, in subjecting water and oil to a further helicoidal motion before discharging the emulsion.

By means of the method of the present invention it is also possible to prepare very concentrated emulsions (10–17%) which can be used as make up liquids suitable to restore the concentration of already exhausted emulsions. A further subject of the present invention is the apparatus whereby the method of the invention is preferably and advantageously carried out.

The apparatus will now be described with reference to the accompanying drawings which are illustrative of the same.

Such apparatus comprises a duct inside which a Venturi is present, a sliding tube inserted in the duct and provided at its end with a nozzle in the form of a frustum of a cone, provided with involuted grooves on its external face and possibly on its internal face, the external surface of said nozzle being parallel to, or mating with, the surface of the converging portion of the Venturi.

The tube is utilized for introducing water into the duct, said water being introduced at the end opposite to that in which th frustum of a cone nozzle is placed; the tube is internally provided with a helicoidally wound (twisted) thin strip having its axis parallel to the axis of the tube.

The duct upstream of the Venturi is provided with holes through which the oil is drawn from a side pipe into the zone exisiting between the frustum of a cone nozzle and the Venturi wall.

The duct also is provided, at the end of the Venturi, with a perforated baffle and, further on, with another helicoidally wound (twisted) thin strip like the foregoing one in proximity of the end of the duct.

IN THE DRAWINGS

Said drawings schematize, as aforesaid, a preferred practical embodiment, which is described only for exemplary but unrestrictive purposes, since construction variants can be made without departing from the scope of the present invention.

Figure 1:
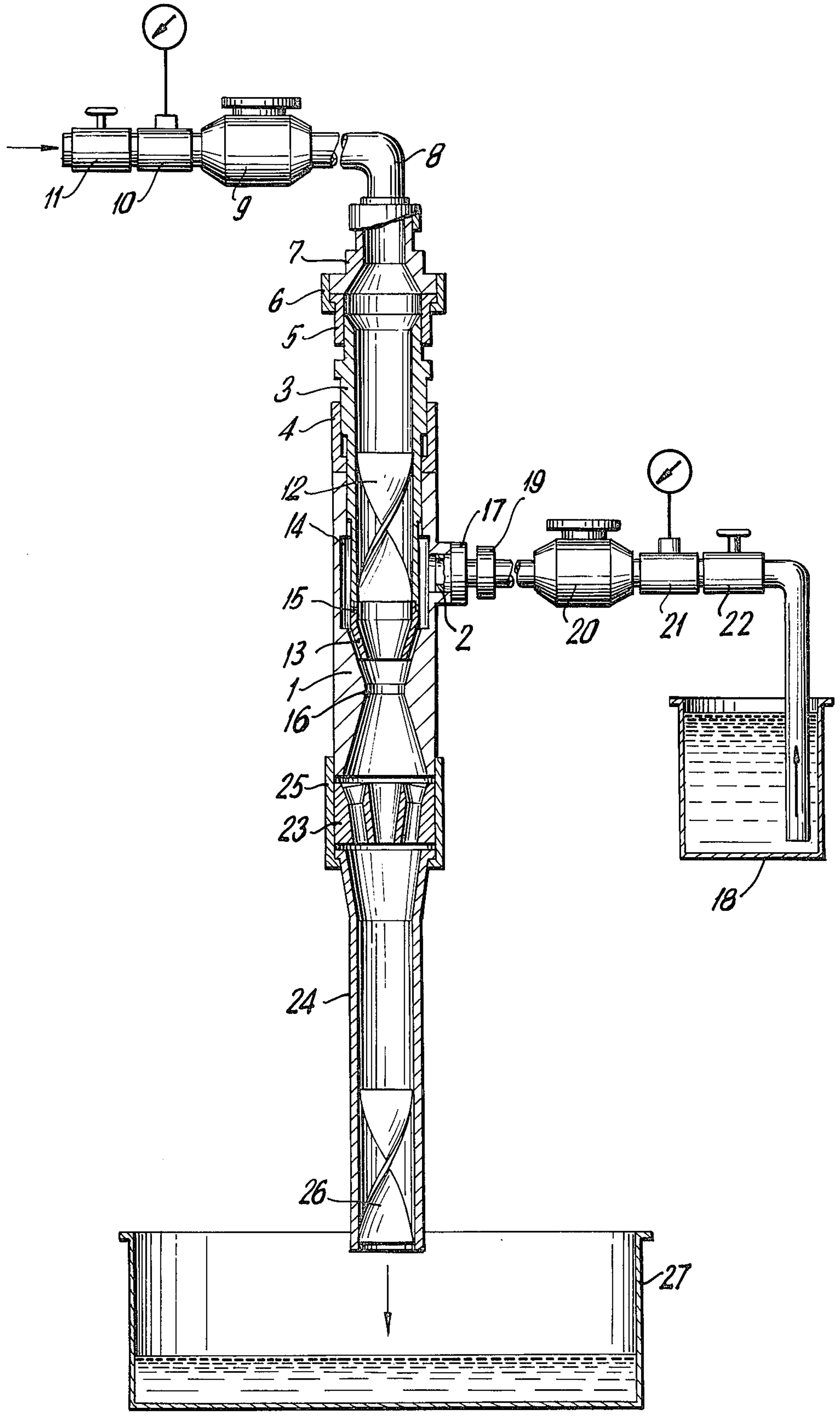
FIG. 1 is a vertical section of the apparatus which is the subject of the invention.

For instance, instead of the valve 11 regulating the water flow rate in FIG. 1, use can be made of a remote controlled motorized valve, which can be shut off in accordance with an electric signal coming from a level controller in the oil tank 18 when oil is drying up.

In general, elements equivalent to those illustrated in the accompanying drawings and also the form of the device, may be changed in accordance with the use of the apparatus.

The method for the continuos preparation of oil emulsions is preferably based on the use of the apparatus illustrated in FIG. 1.

It is essentially constituted by a central duct 1, inside which there is the Venturi and upstream of this Venturi, one or more side inlets radially placed, indicated by reference 2, for the entrance of the oil.

Figure 2:
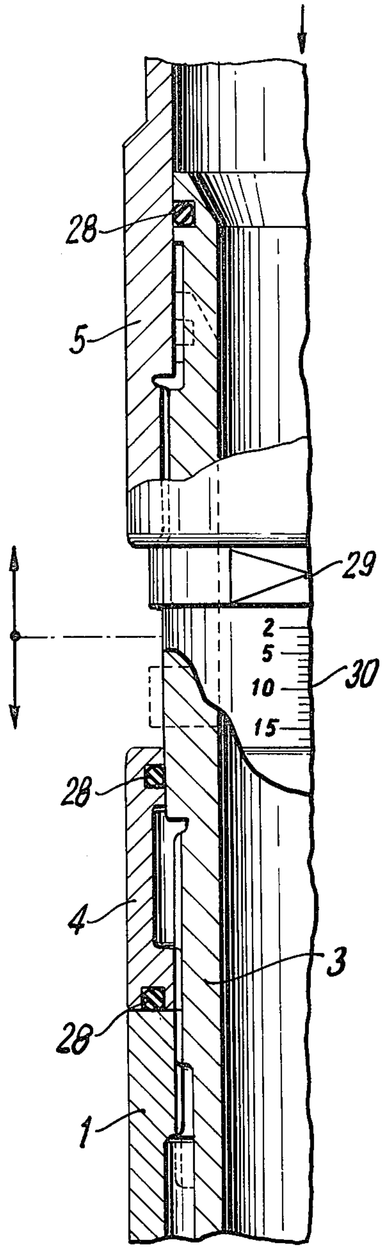
FIG. 2 is a longitudinal partial section of the tube provided with a nozzle whose task is to regulate the concentration of the emulsions.

Tube 3, the details of which are illustrated in FIG. 2 and the function of which will be explained herein-after below, can slide inside duct 1 along its axis; the tube can be locked to duct 1 by means of ring 4.

In the upper-portion of tube 3 there is provided a water inlet by means of a three-piece connection composed of the elements 5, 6 and 7.

To connection 7 there is connected a portion of pipe 8 which can assume various shapes in accordance with the requirement and which is provided with a volumetric meter the 9 for metering flow rate, a manometer 10 for controlling the pressure and a valve 11 for regulating the water flow rate.

In the lower internal portion of tube 3 there is inserted a spirally wound (twisted) strip 12 which is adapted to impart helicoidal penetration motion to the stream of water before its exit from the orifice of the frustum of a cone nozzle 13 so as to increase the ejection effect of the converging portion of Venturi of duct 1 and of the external annular chamber 14 concentric with tube 3.

Figure 3:
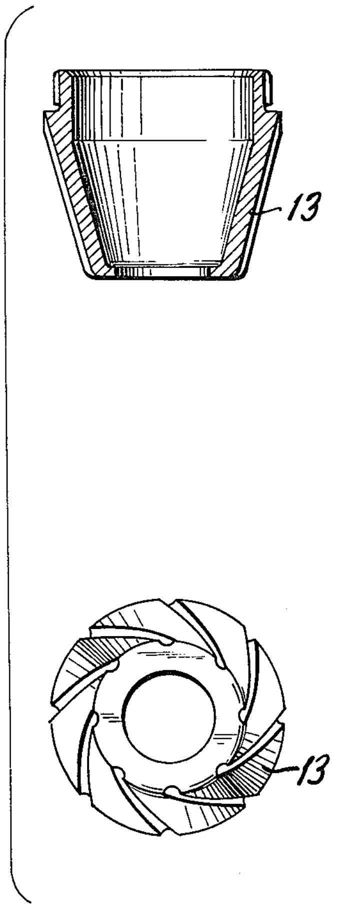
FIG. 3 is a longitudinal section and a plan view of the frustum of a cone nozzle provided with involuted grooves for starting the emulsifying process.

The frustum of a cone nozzle 13 is best illustrated in FIG. 3; it is connected in an interchangable way to the lower end of tube 3 and fastened to the same by means of latch 15.

The external conical surface of nozzle 13 may adhere perfectly to the upper internal surface of the Venturi or it may be spaced away from the same by means of the axial regulation of tube 3 illustrated in FIG. 2.

The water jet leaving nozzle 13 passes through throat 16 of the Venturi and enters the diverging zone of the Venturi of duct 1. There because of the known Bernoulli principle and consequently because of the principle of the Bunsen aspirator, the depression which this creates in throat 16 and then in chamber 14 draws oil through inlet 2 and connection 17 communicating with the same.

Oil from tank 18 is therefore drawn through the portion of pipe 19, which may assume very different shapes and positions according to requirements and with which are associated a volumeteric meter 20 for reading flow rates, a vacuum meter 21 for controlling the degree of vacuum and a valve 22 for a further regulation of the oil flow rate already defined in any case by the pressure and flow rate of water flowing in tube 3 and by the axial regulation of tube 3 which regulation makes it possible to obstruct more or less, throat 16 of duct 1 by means of nozzle 13. Oil drawn through inlet 2 and connection 17 enters the annular chamber 14 and the converging zone of the Venturi, contacting the water in throat 16 and it is here that, owing to the helicoidal grooves present on the external conical surface of nozzle 13, illustrated in FIG. 3, a dextrorse or sinistrorse helicoidal penetration motion is imparted to the oil inside the stream of water thus starting the emulsifying process in a continuous and constant way for a sufficient time to achieve the desired concentration.

The emulsion so obtained passes into the diverging zone of the Venturi of duct 1, goes through perforated baffle 23 and passes through tube 24, all fastened to duct 1 by means of ring 25, then it passes along the spiral strip 26 having the same function as strip 12 already mentioned, leaves tube 24 and enters tank 27 for the oil-water emulsion.

Figure 4:
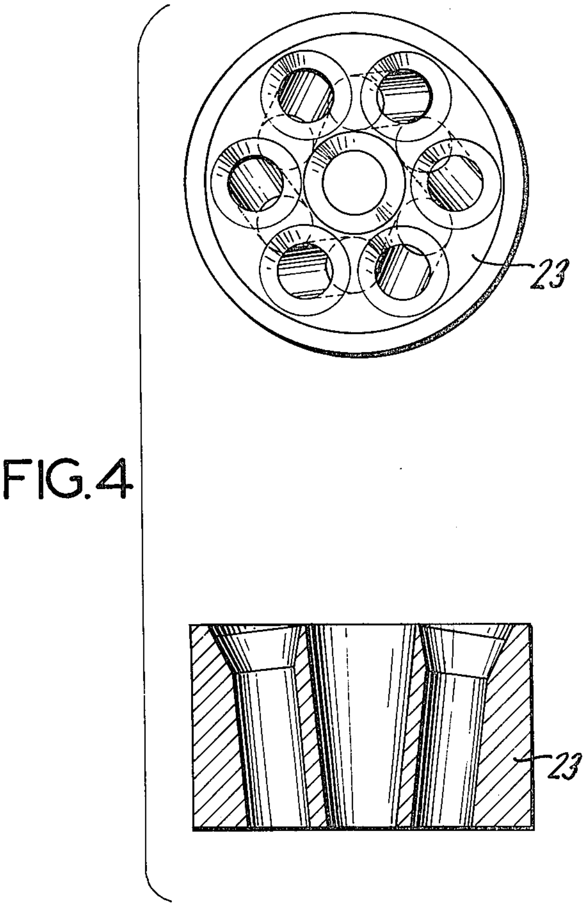
FIG. 4 is a plan view and a section of the perforated baffle placed downstream of the Venturi tube, which imparts a higher penetration to the two liquids forming the emulsion in order to render said emulsion homogeneous and stable.

Numerical reference 23 indicates the perforated baffle illustrated by means of a section and a plan view in FIG. 4; it has a central conical hole and six or more holes drilled along a single circumference concentric with the conical hole, said last holes having their inclined axes convergent toward the longitudinal axis of the baffle but oblique with respect to the longitudinal axis and lying on another plane; they are placed in such a way that they impart to the formed emulsion a centrifugal effect with a sinistrorse or dextrorse rotation, that is the opposite of that of arrival so that a vorticity is created with consequent fractionization of the oil particles and higher penetration of the two liquids constituting the emulsion, thus rendering the same more homogeneous and more stable.

By means of the method and apparatus according to the invention it is in fact possible, given a determined type of emulsifiable oil, to obtain emulsions with oil particles in water always smaller than those obtainable by means of conventional mechanical means.

Another aspect of the present invention, is the possibility of regulating the emulsion concentration, that is to regulate the amount of oil used and therefore its percentage as a function of the water flow rate, once the value of the water pressure has been prefixed.

By virtue of the size of the apparatus and therefore the emulsion flow rates obtainable by means of the present apparatus, it is possible to obtain thereby concentrations ranging from 2 to 17% while the apparatus is working and without need to close the water flow.

The operation is carried out by adjusting the tube 3 illustrated in detail in FIG. 2: it can axially slide along collar 5 and duct 1, after release of ring 4, with the possibility of pressure seal by means of rings 28.

The longitudinal adjustment of tube 3, by means of key 29, makes it possible to increase, more or less, the distance between nozzle 13 and throat 16, permitting - in view of the aforesaid considerations - regulating the flow rate of oil used as a function of the effluent water flow rate.

In fact once the water flow rate is maintained constant at a certain value on the flow meter 9 after its pressure has been fixed, it is possible, by acting on tube 3 and controlling the values of the flow rates of oil flow meter 20, to calibrate the apparatus and fix an index of opening of the nozzle which results in an emulsion concentration ranging in value from 2 to 17.

This graduation, which is indicated by reference 30, in FIG. 2, was effected in a way similar to a scale on the external surface of tube 3 and the reference mark is indicated by means of a radial notch on the upper face of ring 4.

It is obvious that the method of the present invention and the apparatus above described can be used, by suitable modifying dimensions and configuration, for the already cited purpose and also for other liquids or fluids, the aim being that of producing emulsions or mixtures of components in accordance with the described concentrations.

What we claim is:

1. The method of preparing an oil and water emulsion as a continuous process which comprises, feeding a stream of water to a duct containing a Venturi providing a converging frustum of a cone zone, a diverging frustum of a cone zone and a central zone joining the two frustum of a cone zones, causing the stream to flow through a zone located upstream of the Venturi and having means for causing the stream to flow along a first helicoidal path through the converging frustum of a cone zone to said central zone, drawing oil for emulsification to the duct at a point adjacent said zone upstream of the Venturi and causing said oil to flow along a helicoidal path in the same direction as said first helicoidal path so that the oil and water mix and emulsify in said central zone, causing the emulsion so formed to flow through the diverging frustum of a cone zone, then causing said emulsion to flow along a second helicoidal path whose slope is the reverse of the slope of the first helicoidal path, and thereafter discharging the emulsion from said duct.

2. The method as claimed in claim 1, wherein said emulsion is directed along the second helicoidal path by causing the emulsion to flow through inclined passageways in a baffle extending across the duct downstream of the Venturi.

3. Apparatus for the preparation of a water and oil emulsion as a continuous process comprising, a duct containing a Venturi providing a converging frustum of a cone surface, a diverging frustum of a cone surface and a throat, a tube mounted for adjustable sliding movement in said duct upstream of the Venturi, a frustum of a cone nozzle mounted on the downsteam end of the tube to direct a stream of water into said throat and having an external surface parallel to said converging frustum of a cone surface and provided with involuted grooves, said duct having an annular chamber surrounding the lower portion of said tube and communicating with said grooves and with said throat, an oil supply pipe communicating with said chamber, a helicoidally wound strip mounted in said tube with its axis parallel to the tube axis, adapted to direct the water to flow from the nozzle along a first helicoidal path, and means located in the tube downstream of the Venturi adapted to direct the emulsion to flow along a second helicoidal path whose slope is opposite to the direction of slope of the first helicoidal path.

4. Apparatus as claimed in claim 3, wherein said means for directing the emulsion along a second helicoidal path comprises a baffle extending across the duct downstream of the Venturi and having passageways with convergent axes inclined with respect to the central axis of the duct extending therethrough, and a helicoidally wound strip mounted in the tube adjacent its discharge end with its axis parallel to the axis of the duct.

* * * * *